United States Patent [19]
Miller

[11] 3,884,505
[45] May 20, 1975

[54] MARKING FILM
[75] Inventor: James A. Miller, Akron, Ohio
[73] Assignee: Morgan Adhesives Company, Stow, Ohio
[22] Filed: Apr. 23, 1973
[21] Appl. No.: 353,657

[52] U.S. Cl. ............... 282/27.5; 428/40; 428/212; 428/908; 428/913; 40/2 R; 40/136
[51] Int. Cl. .............................................. B44f 1/00
[58] Field of Search ............. 40/136, 2 R; 161/1, 2, 161/6, 252; 117/122

[56] References Cited
UNITED STATES PATENTS

| 2,925,625 | 2/1960 | Souza | 161/125 X |
| 3,022,541 | 2/1962 | Passley et al. | 264/291 |
| 3,309,257 | 3/1967 | Borack | 161/6 |
| 3,322,613 | 5/1967 | Rasmussen | 161/252 X |
| 3,379,560 | 4/1968 | Tharp | 161/6 X |
| 3,471,353 | 10/1969 | Rasmussen | 161/55 X |
| 3,491,185 | 1/1970 | Rasmussen | 264/287 X |
| 3,496,059 | 2/1970 | Rasmussen | 161/146 |
| 3,574,044 | 4/1971 | Shepherd | 161/6 |
| 3,753,841 | 8/1973 | Wheeler | 161/6 |

Primary Examiner—Mayer Weinblatt
Attorney, Agent, or Firm—Oldham & Oldham Co.

[57] ABSTRACT

A marking film including a two ply laminate layer of high density polyethylene each film of which is oriented in one direction and with the directions of orientation being offset with relationship to each other, which laminated layer is white and a backing layer on one face of the laminated layer and being of a color other than white. The laminated layer becoming substantially clear when locally deformed to reveal the backing layer color therethrough. Laminates of the invention can also provide "copy-back" products.

6 Claims, 7 Drawing Figures

MARKING FILM

This invention particularly relates to marking films for use as labels or the like and wherein locally deforming or embossing the laminated marking film results in rendering the same substantially clear whereby a backing color is seen through the surface layer in the locally deformed areas to provide tapes and other materials for use as labels or the like.

BACKGROUND OF THE INVENTION

Heretofore there have been various efforts made to provide different types of plastic marking films or tapes and wherein these tapes will change from an initial colored condition to white when locally deformed. Specifically, U.S. Pat. Nos. 2,925,625 and 2,996,822 represent previous efforts in this field and wherein so-called rigid plastic sheeting made from polyvinyl chloride and similar materials have been provided. Such "rigid" films have the property, while initially formed to a predetermined color, of turning white when locally deformed or embossed so that a relatively rigid marking tape is made on which white letters and identification marks can be made. These prior films have been somewhat difficult to use in that a special embossing tool is required. Also prior tapes have not been fully flexible. The thickness of the films used in many instances has been about 0.006 to about 0.012 inches or more.

The general object of the present invention is to provide an improved marking film which is flexible and which is relatively inexpensive to produce and which can be deformed for localized color change and label formation by conventional means.

Another object of the invention is to provide relatively thin marking films which are easy to use and wherein any desired backing color can be used for providing colored marking indicia on the marking film.

It is a further object of the invention to provide a marking film in a label laminate, which film is made from two plies of uniaxially oriented high density polyethylene film and wherein the directions of orientation are not aligned with each other in the two films as laminated.

Other objects of the invention will be made more apparent as the specification proceeds.

When referring to members identified in the specification and shown in the drawing, corresponding numerals are used to facilitate comparison between such members.

Reference now is made to the accompanying drawings, wherein.

Figure 1:
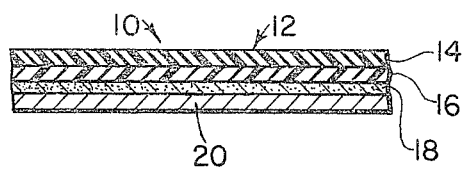
FIG. 1 is a fragmentary vertical cross sectional view through one laminate embodying the principles of the invention.

It will be realized that the laminates and films used in the practice of the invention are all quite thin and that the dimensions shown on the products of the invention as illustrated in the drawings are not representative but have been enlarged for purposes of clarity.

In making the improved laminate of the invention, preferably a two-ply layer of high density polyethylene film is used. The individual films in such laminated ply have been processed so that the films each have been uniaxially oriented to the extent that a severe stress-whitening occurs in the film due to crystallization. The product may be made in the manner disclosed in U.S Pat. No. 3,471,353 or in any other known manner. Other types of laminated polyethylene films are disclosed in U.S. Pat. Nos. 3,322,613; 3,496,059 and 3,491,185. Laminates of this type are provided by Valeron Plastics, Inc., of Houston, Texas under the trademark of "VALERON".

SUBJECT MATTER OF INVENTION

The invention, as one embodiment thereof, relates to a laminated structure, which may be called a marking film or product and comprises a two-ply laminate layer of high density polyethylene wherein each ply is oriented in one direction and where the directions of orientation are not in alignment in the laminated layer to provide a white surface layer, and a backing layer on one face of the laminated layer and suitably carried thereby, the backing layer being of a color other than white so that when localized forces are applied to the laminated surface layer, it becomes substantially clear and the backing material color can be seen therethrough.

Figure 4:
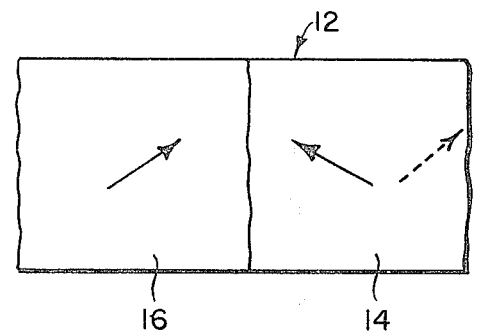
FIG. 4 is a plan view indicating the direction of orientation of the individual films used in forming a laminate ply of polyethylene films for use in practice of the invention.

With particular reference to the structure shown in the drawings, a laminated marking film or the like is indicated as a whole by the numeral 10. This marking film or product is made from a surface layer 12 which comprises two plies of high density polyethylene 14 and 16. As indicated in FIG. 4, the top film or ply 14 has been uniaxially oriented in the direction indicated by the arrow appearing thereon; whereas, the lower film or ply 16 has been uniaxially oriented in one direction but with the two plies being associated with each other and suitably secured together in known manners so that the directions of axial orientation in the two films are widely different, preferably at about 90° to each other. Because of severe stresses and crystallization occurring in the orientation process, the plies 14 and 16 have been rendered white. However, when a localized force is applied to the film or surface layer 12, the crystallization thereof is lost and the whiteness in the surface layer disappears so that the stressed areas of the film become substantially clear and/or transparent.

To complete the marking film or product 10, as shown in FIG. 1, a layer of pressure sensitive adhesive 18 is applied to the back surface of the lower layer 16 and this adhesive layer is colored in a conventional manner to a color other than white. A backing layer 20 is also provided which backing layer 20 is removably secured to the pressure sensitive adhesive layer 18 as by coating the surface of the backing layer 20 adjacent the pressure sensitive adhesive layer with a release coating of a conventional nature. The backing layer 20 normally is formed from any suitable paper or similar material. The layers of pressure sensitive adhesive and backing each can be only a few mils thick, and the surface layer 12 will perform satisfactorily in practice of the invention down to a thickness of approximately 0.004 inch up to any other reasonable thickness such as 0.010 inch.

The surface layer 12 is quite flexible and can be provided at relatively low cost, scarcely more than the cost of the polyethylene forming the film layers.

Figure 5:
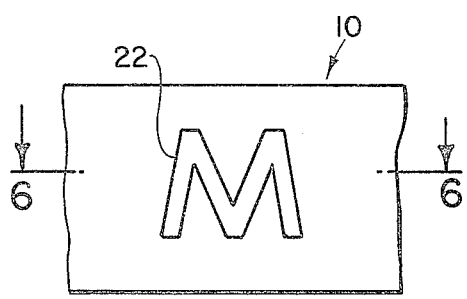
FIG. 5 is a plan view of a laminate of the invention with a marking provided thereon.
Figure 6:
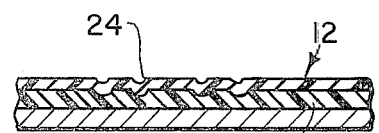
FIG. 6 is a vertical cross section taken on line 6-6 of FIG. 5.

Reference now is made to FIGS. 5 and 6 wherein a section of the product 10 is shown and where a letter M indicated at 22 has been formed in the surface layer 12 of the product. This letter M can be formed by any suitable member, such as a type bar, or stylus, or any object which applies a narrow band of any appreciable force to the surface layer. Thus, the imprinting can be done with a typewriter, using the no ribbon, or stencil position. Or this imprinting of the letter M and equivalents could be done with a hand imprinter of the type currently in use for forming letters in crease-white polyvinyl chloride tapes, but wherein a relatively shallow inward embossing is provided. In previously know imprinters of the type to which the invention relates, normally the embossed surface is forced outwardly an appreciable distance from its original plane in the laminate product whereas in the present invention, the embossing action is a forcing inwardly of localized areas of the surface layer only a very slight distance. Or, pressure can be applied for localized deformation by applying a rolling type pressure over the film when supported on an embossed surface such as that provided on credit cards in wide use today. Hand imprinting with a stylus type instrument also could be used for letter and indicia formation on the products of the invention. The actions described thus provide a localized deformation in the surface layer 12 as indicated at 24 in FIG. 6. By this action, the initial whiteness of the surface layer 12 has been destroyed and the embossed or imprinted areas 24 become substantially clear or transparent so that the color of the pressure sensitive adhesive layer 18 in this product is clearly observed and the desired imprint has been provided on the marking film, label or equivalent product 10 of the invention.

Figure 2:
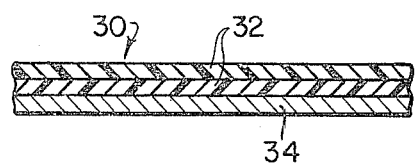
FIG. 2 is a cross sectional view like FIG. 1, but of a modified type of laminate of the invention.

In FIG. 2, a marking film, label or the like is indicated as a whole by the numeral 30. This has a surface layer 32 thereon wherein this layer is made from the same polyethylene films as the surface layer 12 of FIG. 1, and a printed color coating 34 is applied to the back surface of the surface layer 32. Hence, again, in this instance, when localized portions of the surface layer 32 are deformed, the backing color 34 is visible therethrough for marking and labeling purposes.

Figure 3:
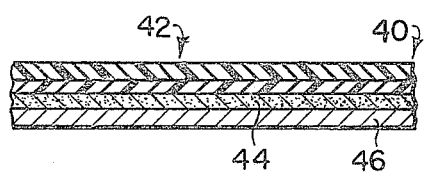
FIG. 3 is a further vertical cross section of a modified laminate of the invention.

Yet a further marking film label or equivalent product of the invention is indicated as a whole by the numeral 40 in FIG. 3. Again, a surface layer 42 like that of the product 10 is provided and it has a layer of a transparent pressure sensitive adhesive 44 thereon, as indicated. A colored backing sheet 46 next is provided. The colored backing sheet can be just a layer of paper of a desired color or be any other medium, as desired.

The compounding of the adhesives used in practice of the invention is conventional.

Figure 7:
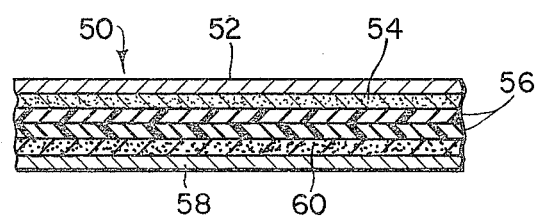
FIG. 7 is a vertical cross section of a "copy-back" product of the invention.

In FIG. 7, a laminated product of the invention is provided and this is available for so-called "copy-back" applications. In this instance, a laminate 50 would comprise a face or surface layer of any suitable paper 52 which has a coating or layer 54 of a pressure sensitive adhesive on the back surface thereof. Then, a two-ply polyethylene film or sheet 56, like the sheets or plies 12 referred to hereinbefore, is provided. This two-ply sheet of polyethylene has a conventional release coating on the top or face surface thereof contacting the layer of the adhesive 54 whereby the paper sheet 52 with the adhesive thereon can be separated from the remainder of the laminate when desired. A backing sheet 58 is secured to the two-ply film or layer 56 by means of a colored or dark adhesive layer 60. Hence, in use, the laminate or member 50 of the invention could have any desired indicia printed thereon as by an electric typewriter or the like and this would make the desired imprint on the surface paper layer 52. However, at the same time, sufficient force has been exerted on the polyethylene two-ply film 56 as to relieve the crystallization thereof in the locally stressed areas whereby the impression has rendered such portion of the sheet 57 substantially clear. Thus, the colored adhesive layer 60 on the back surface thereof is apparent and shows through in the relieved areas when the surface layer 52 and the adhesive layer 56 adhered thereto is removed to be used, for example, as a label. The remainder of the material provides a permanent impression, or record of what the label formed comprised. Hence, this modification of the invention provides two records of the desired indicia and one record (or label) can be removed to expose the second record. Any desired stylus, typewriter, or other localized deforming article can be used for stressing localized areas of the laminate to obtain the imprint desired.

The product of the invention is relatively inexpensive to make, and it provides a flexible member wherein some slight embossing or indentation inwardly of the marking film or product is obtained. Such indentation is so slight, and the film is so flexible, that it does not interfere with the use of the product as a label or when affixing it to any desired surface. Or, the invention can provide a laminate for copy-back applications including provision of a removable label in the product. Thus, it is believed that the objects of the invention have been achieved.

While several complete embodiments of the invention have been disclosed herein, it will be appreciated that modification of these particular embodiments of the invention may be resorted to without departing from the scope of the invention.

What is claimed is:

1. A marking film comprising a two-ply flexible laminate layer of high density polyethylene each ply of which is oriented in one direction and where the directions of orientation are not in alignment in the laminated layer, said laminated layer being white and a backing layer on one face of said laminated layer and being of a color other than white whereby when localized forces are applied to said laminated layer it becomes substantially clear and the backing material color can be seen therethrough.

2. A marking film as in claim 1 where said backing layer is a printed color coating.

3. A marking film as in claim 1 where said backing layer is a colored sheet secured to said face by a transparent adhesive.

4. A marking film as in claim 1 where said backing layer is a colored pressure sensitive adhesive.

5. A marking film comprising a top surface paper layer, an adhesive layer on the back of said paper layer, a two film flexible laminate layer of high density polyethylene each film of which is oriented in one direction and where the directions of orientation are not in alignment in the laminated layer removably secured to said adhesive layer, said laminated layer being white, and a backing layer on the bottom face of said laminated layer and being of a color other than white whereby when localized forces are applied to said laminated layer through said paper layer the laminated layer becomes substantially clear and the backing material color can be seen.

6. A marking film as in claim 5 where said backing layer is a paper sheet secured to said bottom face by a colored adhesive layer.

* * * * *